Patented Nov. 6, 1951

2,574,234

UNITED STATES PATENT OFFICE 2,574,234

METHOD FOR THE PREPARATION OF 1-ACETOXY-1,1-DICYANO ETHANE

Alan E. Ardis, Cuyahoga Falls, and Floyd D. Stewart, Akron, Ohio, assignors to The B. F. Goodrich Company, New York, N. Y., a corporation of New York No Drawing. Application January 10, 1950, Serial No. 137,881

8 Claims. (Cl. 260—465.4)

This invention relates to method for the preparation of 1-acetoxy-1,1-dicyano ethane, and pertains more particularly to its preparation by the vapor phase, catalytic reaction of ketene and hydrogen cyanide.

In U. S. Patent 2,476,270 it is disclosed that 1-acetoxy-1,1-dicyano ethane (also known as diacetyl cyanide) is an extremely valuable compound in that it readily undergoes pyrolysis when heated to temperatures of about 450° C. to 850° C. to give monomeric vinylidene cyanide, certain polymers of which form excellent synthetic filaments, films and the like.

Heretofore, 1-acetoxy-1,1-dicyano ethane has been prepared by the reaction of acetic anhydride with sodium or potassium cyanide, by the dimerization of acetyl cyanide in the presence of a base and, together with alpha-cyanovinyl acetate, by the liquid phase reaction of ketene and hydrogen cyanide in the presence of a tertiary amine. The vapor phase reaction of ketene and hydrogen cyanide over surface-active materials such as pumice has also been reported, but as resulting only in the production of monomolecular acetyl cyanide.

We have now discovered that when vapors of ketene and hydrogen cyanide are passed over a catalyst bed composed of an oxide of a metal having a valence greater than 1 and occurring in periods 2 to 4 of the periodic table at a temperature of from about 200° C. to 550° C., chemical reaction occurs between the ketene and the hydrogen cyanide to form 1-acetoxy-1,1-dicyano ethane in excellent yield. The reaction of ketene with hydrogen cyanide according to this invention is believed to proceed substantially according to the following equation:

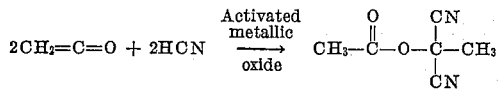

As will be seen from the above reaction equation two moles of ketene are stoichiometrically required to react with two moles of hydrogen cyanide to form 1-acetoxy-1,1-dicyano ethane. However, the two reactants may be brought together in any desired ratio; in fact, it has been discovered that highest yields of 1-acetoxy-1,1-dicyano ethane are obtained when a slight excess of ketene, for example about 1.2 to 2.0 moles of ketene for each mole of hydrogen cyanide, is present.

The temperature and pressure at which the reaction is conducted may be varied considerably. In general, it may be stated that temperatures in the range of from 200° C. to 450° C. are operative, with a particularly preferred range being from 300° C. to 400° C. The reaction is ordinarily carried out at substantially atmospheric pressures, although higher pressures and sub-atmospheric pressures are also operative. Dilution of the reactants with an inert gas such as nitrogen, helium or the like permits the attainment of sub-atmospheric partial pressures, and also facilitates mixing of the reactants and passage of the reactants over the catalyst bed.

The catalyst over which the ketene and hydrogen cyanide are passed in the preparation of 1-acetoxy-1,1-dicyano ethane is an oxide of a metal possessing a valence in excess of 1 and occurring in periods 2 to 4 of the periodic table. The generally preferred members of this class of catalysts are the oxides of magnesium, calcium, zinc, strontium, cadmium, aluminum, titanium, vanadium, chromium, molybdenum and manganese. An especially preferred class of oxides includes the oxides of magnesium (atomic number 12) and aluminum (atomic number 13) which are found in the second (short) period of the periodic table; and titanium (atomic number 22) and vanadium (atomic number 23) which appear in the third (long) period of the periodic table. Oxides of these four metals such as magnesia, MgO, alumina, $Al_2O_3$, vanadia, $V_2O_5$, and titania, $TiO_2$, are especially preferred since they are most conveniently and economically used and result in the obtainment of highest yields of pure 1-acetoxy-1,1-dicyano ethane. It is also highly desirable that the activated form of these oxides be utilized since highest conversions and yields are thereby obtained. Where the metal possesses more than one valence, the oxide in which the metal has its highest valence is preferably used.

While preferred metallic oxides have been disclosed in the foregoing paragraph, it is to be understood that oxides of the other metals having a valence greater than 1 and occurring in periods 2 to 4 of the periodic table are also operative, although the yields and conversions are appreciably higher when the preferred oxides are utilized.

No special reaction procedures are necessary in carrying out the reaction of the present invention. Thus, reaction is effected simply by passing vapors of ketene and hydrogen cyanide with or without a diluent gas, over the heated catalyst bed. However, useful expedients, which result in higher yields and conversions, but which are not critical expedients in themselves, include the use of a preheater to mix together the ketene and the hydrogen cyanide and to preheat them to a temperature of about 200° C. before they are passed over the catalyst, and the use of glass, ceramic or other packing material on the entrance side of the catalyst bed in order further to mix and preheat the reactants. It is also desirable that the hydrogen cyanide be substantially anhydrous, since any water present may tend to react with the ketone and reduce the yield of the desired product.

The contact time, that is, the time during which the reactant gases remain in contact with the catalyst, may be varied widely without substantially effecting the yield of 1-acetoxy-1,1-dicyano ethane. For example, contact times as low as 0.05 second to 1.0 or more seconds give excellent results.

The effluent gases which pass from the catalyst chamber include the desired 1-acetoxy-1,1-dicyano ethane, together with some unconverted reactants and by-products. The gases may be used in other processes, as such, or if desired, they may be condensed and the 1-acetoxy-1,1-dicyano ethane recovered from the resulting condensate by distillation, preferably at reduced pressures, or by other common means of separation.

The following examples are intended to illustrate more completely the preparation of 1-acetoxy-1,1-dicyano ethane according to the method of this invention, but are not to be construed as a limitation upon the scope thereof, for there are, of course, numerous possible variations and modifications. In the examples, all parts are by weight.

EXAMPLE I 1-acetoxy-1,1-dicyano ethane is prepared by passing ketene and hydrogen cyanide over an activated alumina catalyst. The alumina is placed in a vertical glass tube which also contains glass beads to aid in mixing the reactant gases. The reactants are first passed in the ratio of 1.4 moles of ketene to 1.0 mole of hydrogen cyanide through a horizontal preheated tube maintained at about 200° C. and then through the heated catalyst tube. The flow rate is so adjusted that the reactants remain in contact with the catalyst for from 0.07 to 0.32 second. The effluent gases pass from the catalyst chamber to a condenser and the resulting liquid condensate is fractionated to give substantially pure 1-acetoxy-1,1-dicyano ethane (B. P. 110° C. at 18 mm.). The conversion of hydrogen cyanide to 1-acetoxy-1,1-dicyano ethane and the yield of 1-acetoxy-1,1-dicyano ethane based on the hydrogen cyanide charged less the hydrogen cyanide present in the effluent gases, are determined at the end of each hour after the first two hours. These results together with the temperature maintained in the catalyst tube during each hour are recorded in Table I below:

Table I

| Time (Hours) | Temperature, °C. | Per cent Conversion | Per cent Yield |
|---|---|---|---|
| 3 | 310 | 23.6 | 31 |
| 4 | 310 | 45.8 | 73 |
| 5 | 310 | 47.3 | 73 |
| 6 | 310 | 43.4 | 72 |
| 7 | 310 | 45.8 | 66 |
| 8 | 310 | 45.8 | 73 |
| 9 | 310 | 45.8 | 74 |
| 10 | 350 | 39.6 | 67 |
| 11 | 350 | 28.0 | 65 |
| 12 | 310 | 31.4 | 60 |
| 13 | 310 | 43.4 | 75 |
| 14 | 310 | 32.3 | 82 |
| 15 | 280 | 42.5 | 94 |
| 16 | 280 | 34.3 | 79 |
| 17 | 280 | 35.2 | 72 |
| 18 | 250 | 39.6 | 90 |
| 19 | 250 | 30.0 | 80 |
| 20 | 250 | 27.8 | 56 |
| 21 | 390 | 41.0 | 90 |
| 22 | 390 | 26.2 | 51 |
| 23 | 390 | 26.0 | 81 |

EXAMPLES II TO IV

Example I is repeated except that other of the catalyst disclosed hereinabove are utilized. The particular catalyst used in each example, temperature at which the catalyst is maintained, and the yield and conversion of 1-acetoxy-1,1-dicyano ethane are recorded in Table II.

Table II

| Example | Catalyst Composition | Temperature, °C. | Average Per Cent Conversion | Average Per Cent Yield |
|---|---|---|---|---|
| II | Magnesium Oxide | 350 | 15.7 | 21 |
| III | Vanadium Pentoxide-Alumina Mixture (7 hour run). | 350 | 36.4 | 56 |
| IV | Titanium Dioxide-Alumina Mixture (10 hour run). | 220-310 | 34.4 | 48 |

EXAMPLE V

Ketene and hydrogen cyanide are passed for 20 hours over activated alumina maintained at 400° C. in an aluminum catalyst tube. The gases are in the ratio of 1.4 moles of ketene to 1.0 mole of hydrogen cyanide and remain in contact with the catalyst for 0.25 seconds. The effluent gases are condensed and the resulting liquid condensate distilled to give an average yield of 87.5% of 1-acetoxy-1,1-dicyano ethane. The conversion is 42.4%.

EXAMPLE VI

Example V is repeated except that a contact time of 0.41 seconds is utilized. After 29 hours of operation the average yield of 1-acetoxy-1,1-dicyano ethane is 82.0% and the average conversion of hydrogen cyanide to 1-acetoxy-1,1-dicyano ethane is 36.0%.

When the above examples are repeated using other forms or mixtures of the metallic oxides disclosed hereinabove, for example, manganese dioxide, zinc oxide and chromic oxide, 1-acetoxy-1,1-dicyano ethane is again obtained. It is also obtained in good yield when the reactant gases are passed over the catalyst at different molar ratios or at other temperatures in the range of 200° C. to 550° C. However, when pumice is used as the catalyst, monomolecular acetyl cyanide rather than 1-acetoxy-1,1-dicyano ethane is the product.

Besides being useful in preparing monomeric vinylidene cyanide the 1-acetoxy-1,1-dicyano ethane prepared according to the method of this invention is also useful for other purposes. For example, it possesses insecticidal, fungicidal and herbicidal properties as well as being a valuable intermediate in other chemical synthesis.

Although specific examples of the invention have been herein described, it is not intended to limit the invention solely thereto, but to include all of the variations and modifications falling within the spirit and scope of the appended claims.

We claim:

1. The method which comprises passing reactants consisting of ketene and hydrogen cyanide in the vapor phase over a catalyst comprising an oxide of a metal having a valence greater than 1 and occurring in periods 2 to 4 of the periodic table, maintained at a temperature of from 200° C. to 550° C., whereupon chemical reaction occurs between the ketene and hydrogen cyanide to form 1-acetoxy-1,1-dicyano ethane.

2. The method which comprises passing reactants consisting of ketene and hydrogen cyanide in the vapor phase over a catalyst comprising an activated oxide of a metal having a valence greater than 1 and occurring in periods 2 to 4 of the periodic table, maintained at a temperature of from 350° C. to 400° C., whereupon chemical reaction occurs between the ketene and hydrogen cyanide to form 1-acetoxy-1,1-dicyano ethane, and separating said 1-acetoxy-1,1-dicyano ethane from the effluent vapors.

3. The method which comprises passing reactants consisting of ketene and hydrogen cyanide in the vapor phase over a catalyst comprising an activated oxide of a metal having a valence greater than 1 and occurring in periods 2 to 4 of the periodic table maintained at a temperature of from 200° C. to 550° C., whereupon chemical reaction occurs between the ketene and hydrogen cyanide to form 1-acetoxy-1,1-dicyano ethane, and separating said 1-acetoxy-1,1-dicyano ethane from the effluent vapors.

4. The method which comprises passing reactants consisting of ketene and hydrogen cyanide in the vapor phase over a catalyst comprising an activated oxide of a metal having a valence greater than 1 and occurring in periods 2 to 4 of the periodic table, maintained at a temperature of from 300° C. to 400° C., whereupon chemical reaction occurs between the ketene and hydrogen cyanide to form 1-acetoxy-1,1-dicyano ethane, condensing the effluent vapors, and separating said 1-acetoxy-1,1-dicyano ethane from the resulting liquid condensate.

5. The method which comprises passing reactants consisting of ketene and hydrogen cyanide in the vapor phase over a catalyst comprising an activated oxide of a metal selected from the class consisting of aluminum, magnesium, vanadium and titanium, maintained at a temperature of from 200° C. to 550° C., whereupon chemical reaction occurs between the ketene and hydrogen cyanide to form 1-acetoxy-1,1-dicyano ethane.

6. The method which comprises passing reactants consisting of ketene and hydrogen cyanide in the vapor phase over a catalyst comprising an activated oxide of a metal selected from the class consisting of aluminum, magnesium, vanadium and titanium, maintained at a temperature of from 300° C. to 400° C., whereupon chemical reaction occurs between the ketene and hydrogen cyanide to form 1-acetoxy-1,1-dicyano ethane, and separating said 1-acetoxy-1,1-dicyano ethane from the effluent vapors.

7. The method which comprises passing reactants consisting of ketene and hydrogen cyanide in the vapor phase over an activated alumina catalyst maintained at a temperature of from 200° C. to 550° C., whereupon chemical reaction occurs between the ketene and hydrogen cyanide to form 1-acetoxy-1,1-dicyano ethane.

8. The method which comprises passing reactants consisting of ketene and hydrogen cyanide in the vapor phase over an activated alumina catalyst maintained at a temperature of from 300° C. to 400° C., whereupon chemical reaction occurs between the ketene and hydrogen cyanide to form 1-acetoxy-1,1-dicyano ethane, condensing the effluent vapors, and separating said 1-acetoxy-1,1-dicyano ethane from the resulting liquid condensate by distillation.

ALAN E. ARDIS.
FLOYD D. STEWART.

REFERENCES CITED

The following references are of record in the file of this patent:

UNITED STATES PATENTS

| Number | Name | Date |
|---|---|---|
| 2,383,137 | Lecher et al. | Aug. 21, 1945 |
| 2,395,930 | Johnston et al. | Mar. 5, 1946 |
| 2,396,201 | Ray | Mar. 5, 1946 |
| 2,426,014 | Gresham | Aug. 19, 1947 |

OTHER REFERENCES

Nef: Liebig's Annalen, vol. 287, p. 348 (1895).